United States Patent [19]

Tamura et al.

[11] Patent Number: 5,293,095
[45] Date of Patent: Mar. 8, 1994

[54] AIR PRESSURE VARIATION DETECTOR

[75] Inventors: Yukitoshi Tamura, Sakura, Japan; Stephen J. Lane, Chaddleworth, United Kingdom

[73] Assignees: Sumitomo Metal Mining Co., Ltd., Tokyo, Japan; Racom Intellectual Property Ltd., Newbury, United Kingdom

[21] Appl. No.: 781,991

[22] Filed: Oct. 23, 1991

[30] Foreign Application Priority Data

Oct. 31, 1990 [JP] Japan .................. 2-294510

[51] Int. Cl.5 ............................................. H01L 41/08
[52] U.S. Cl. .................... 310/338; 310/317; 73/754
[58] Field of Search .............. 310/317, 330, 338, 319, 310/331, 332, 339, 800; 73/754, DIG. 4

[56] References Cited

U.S. PATENT DOCUMENTS 3,113,223 12/1963 Smith et al. ......................... 310/339
3,769,827 11/1973 Moore ................................... 73/754

*Primary Examiner*—Mark O. Budd
*Assistant Examiner*—Thomas M. Dougherty
*Attorney, Agent, or Firm*—Nils H. Ljungman & Associates

[57] ABSTRACT

The air pressure variation detector comprises a base plate having a through hole or a cavity, a piezoelectric element fixed to the base plate so as to locate above the through hole or the cavity and formed in a strip-like shape having a width narrower than the inside width of the through hole or the cavity, an impedance converter circuit consisting of a field effect type transistor and a leak resistor, and an electrically conductive accomodating container having a vent hole. An output terminal of the piezoelectric element is connected to a gate of the field effect type transistor, and the leak resistor is connected between the gate and a ground terminal of the piezoelectric element. This air pressure variation detector is simple in its composition and can detect with high accuracy slight variations of air pressure in the enaudible region.

8 Claims, 4 Drawing Sheets

AIR PRESSURE VARIATION DETECTOR

BACKGROUND OF THE INVENTION a) Field of the Invention

The present invention relates to an air pressure variation detector which is adapted to be capable of detecting variations of air pressure by using a piezoelectric element and suited, for example, for use with alarm systems.

b) Description of the Prior Art

There are conventionally known various types of detectors to be used as the means for detecting whether or not the enclosed states of enclosed spaces are broken into, houses, automobiles, libraries, moneysafe rooms, refrigerating warehouses and so on. On the basis of on operating principles, these detectors are classified into electromagnetic type, light wave type, electric wave type and sound wave type.

Out of these detectors, the electromagnetic type detector is exemplified by a magnetic approach switch which is composed of a pair of magnets and a reed relay. This switch is used for detecting open/closed states of doors and windows of rooms of houses since it has a relatively simple construction and is inexpensive. However, this electromagnetic detector is incapable of detecting breakage of the wall, door or window on which it is mounted when the central portion thereof is broken, and is therefore unsuited, for example, to prevent robbery from automobiles for which windows of the automobiles are broken very often. Further, the light wave type, electric wave type and sound wave type detectors, which are exemplified by the infrared sensor, microwave sensor and ultrasonic wave sensor, are capable of detecting breakage despite location thereof so far as it is caused by persons, aminals and machines, but have narrow field angles or detecting ranges, whereby these detectors must be installed in a plural number at one site and are obliged to be used only at restricted kinds of locations.

In the recent years, detectors having high sensitivities and convenient for use are increasingly demanded not only for detecting breakage of enclosed states of spaces delimited from external world but also for detecting open/closed states of doors for computerized management of egress and ingress from and into rooms for the neccessity of prevention of robbery of the so-called trade secret management. Since the above-mentioned electromagnetic type and sound wave type detectors, etc. cannot perform detection with sensitivity high enough for meeting these demends, researches are made to improve a pressure sensor which is composed of a combination of a pressure-sensitive element and a diaphragm, and capable of detecting vibrations of air.

From the viewpoint of practical use, however, there still remain technological problems in said pressure sensor for detecting vibrations of air. Speaking concretely, vibrations of air causing slight pressure variations on the order of 0.n to 0.0n $mmH_2O$ at frequencies of several tens to 0.n Hz in a room are produced, for example, by opening or closing a smoothly working door and vibrations of air causing slighter pressure variations at frequencies on the order similar to those mentioned above are produced by opening or closing a sliding door, but the pressure sensor cannot detect accurately the vibrations of air causing such slight pressure variations at such very low frequencies and has a complicated structure which inevitably requires a high manufacturing cost. In addition, researches are made to improve an acoustic sensor for detecting vibrations of air causing slight pressure variations, it is still incapable of detecting inaudible sound waves at the very low frequencies described above.

SUMMARY OF THE INVENTION

In view of the circumstances described above, it is an object of the present invention to provide an air pressure variation detector which is capable of detecting with high accuracy inaudible sound waves especially at very low frequencies.

The air pressure variation detector according to the present invention comprises a base plate having a through hole or a cavity, a piezoelectric element equipped on both the surfaces thereof with electrodes, formed in a strip-like shape having a width narrower than the inside width of said through hole or cavity of said base plate and a thickness thinner than 300 $\mu m$, an impedance converter circuit consisting of a field effect type transistor and a leak resistor, and an electrically conductive accomodating container having a vent hole, one end of said piezoelectric element being supported on said base plate so that said piezoelectric element can vibrate in the through hole or cavity of said base plate, an output terminal of said piezoelectric element being connected to a gate of said field effect type transistor of said impedance converter circuit, and said leak resistor being connected between said gate and a ground terminal of said piezoelectric element.

According to the present invention, since said piezoelectric element is supported only at one end thereof on the base plate and has the strip-like shape, it can be vibrated in the through hole of said base plate, whereby the detector is capable of responding to slight vibrations of air at very low frequeneies and detecting pressure variations caused by the vibrations. Further, by using the combination of said piezoelectric element and the impedance converter circuit, the detector is capable of preventing production of noise, etc. so as to detect variations of air pressure with high accuracy.

This and other objects as well as the features and advantages of the present invention will become apparent from the following detailed description of the preferred embodiments when taken in conjunction with the accompanying drawings.

DESCRIPTION OF THE PREFERRED EMBODIMENTS

Figure 1:
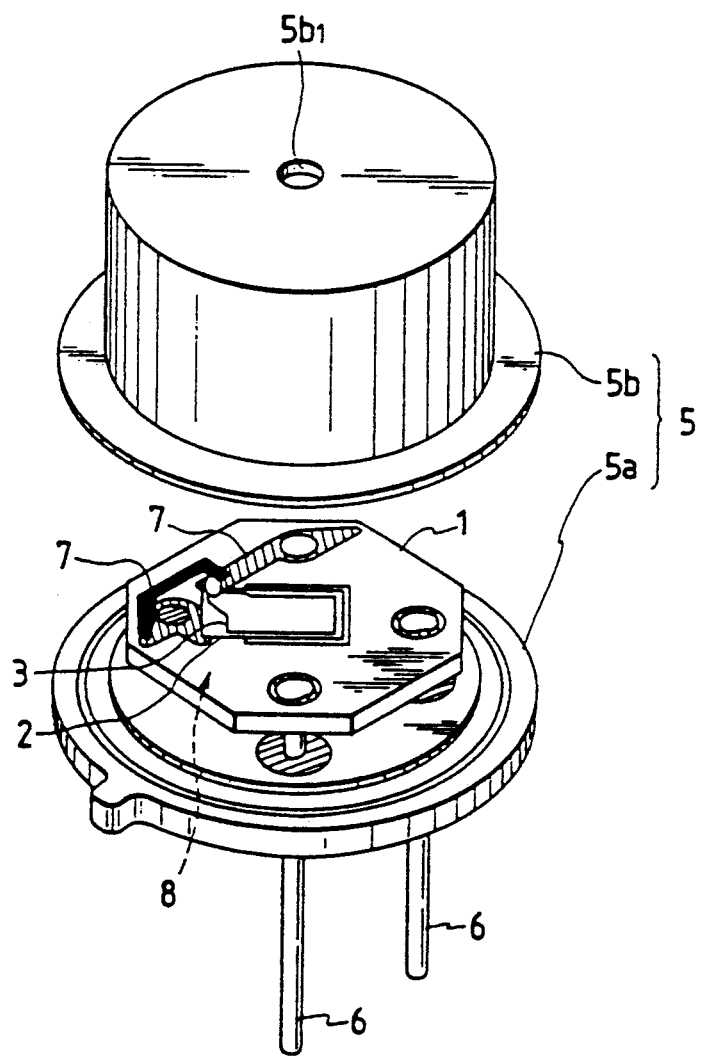
FIG. 1 is a perspective view illustrating an embodiment of the air pressure variation detector according to the present invention in a disassembled condition thereof.
Figure 2:
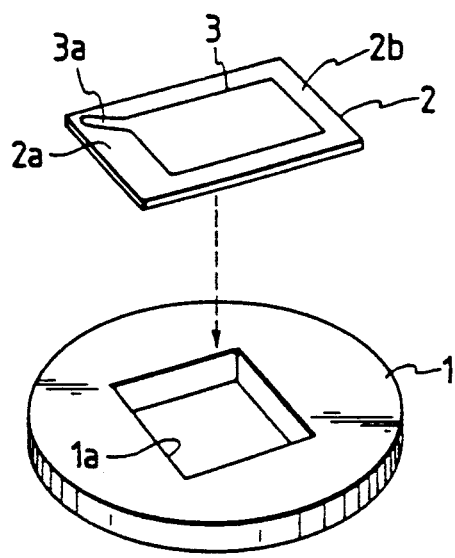
FIG. 2 is a perspective view illustrating the piezoelectric element and the base plate used in the embodiment of the present invention shown in FIG. 1.
Figure 3:
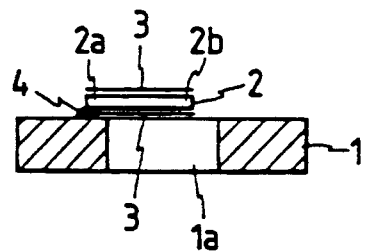
FIG. 3 and FIG. 4 are longitudinal sectional view illustrating the piezoelectric element and the base plate respectively shown in FIG. 2.
Figure 4:
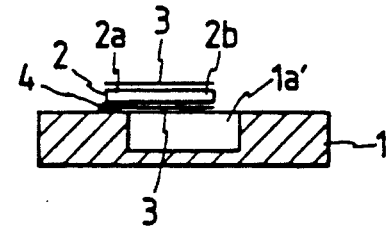

Now, the present invention will be described more detailedly below with reference to a preferred embodiment illustrated in FIG. 1 through FIG. 8. In FIG. 1 illustrating a schematic configuration of the air pressure variation detector according to the present invention, the reference numeral 1 represents a base plate made of alumina, ceramic material or epoxy resin and having a through hole 1a, and the reference numeral 2 designates a piezoelectric element which is formed by molding a piezoelectric ceramic material such as lead zirconate titanate (PZT) or barium titanate ($BaTiO_3$) into a strip-like shape with a thickness thinner than 300 μm and forming electrodes 3 on the surfaces thereof, for example, by vaporizing a metal such as gold, silver or nickel. The piezoelectric element 2 is arranged over the through hole 1a of the base plate 1 as shown in FIG. 2 and FIG. 3, and one end 2a of the piezoelectric element is fixed to the base plate 1 with a bonding agent 4 such as epoxy resin. Further, the piezoelectric element 2 has a width which is narrower than the inside width of the through hole 1a of the base plate 1 so that the other end 2b of the piezoelectric element 2 is located within the inside region of the through hole 1a in the condition where the piezoelectric element 2 is fixed to the base plate 1. In addition, it is possible to form, in place of said through hole 1a, a cavity 1a, having the same size at that of the through hole 1a in said base plate 1 as shown in FIG. 4. In FIG. 1, the reference numeral 5 represents an electrically conductive container consisting of a bottom plate 5a for fixing the base plate 1 by way of support legs 6 which are attached to said base plate and a cover body 5b which is to be set on said bottom plate 5a and having a vent hole $5b_1$, and capable of accommodating said base plate 1 and said piezoelectric element 2. In FIGS. 1 and 2, lead portions 3a of the electrodes 3 of the piezoelectric element 2 are connected to conductors 7 which are laid on the base plate 1. Further, the vent hole $5b_1$ has a diameter on the order of 1 mm and should preferably have a diameter of at least 0.5 mm from the viewpoint of manufacturing.

Figure 5:
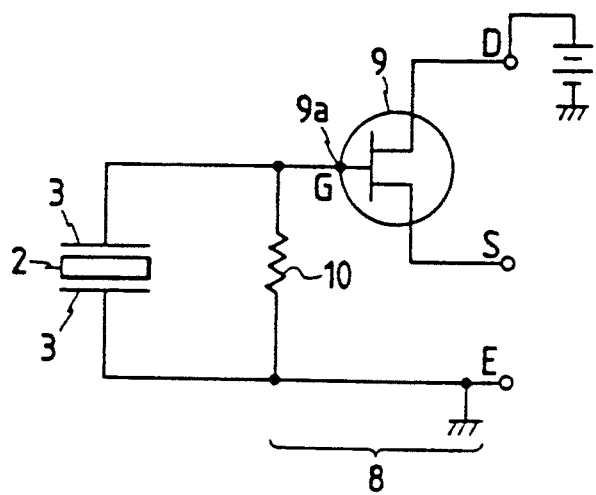
FIG. 5 is a diagram illustrating the circuitry in the air pressure variation detector according to the present invention.

Turning now to FIG. 5 illustrating an example of circuitry in said air pressure variation detector, the reference numeral 8 represents an impedance converter circuit which consists of a field effect type transistor (hereinafter abbreviated as FET) 9 and a leak resistor 10 on the order of $10^7$ to $10^{10}$ Ω. One of the electrodes 3 of said piezoelectric element 2 is connected to a gate 9a of the FET 9, whereas the other electrode 3 is grounded, and said leak resistor is connected between said gate 9a and the ground of said electrode 3. The piezoelectric element 2 is combined with the impedance converter circuit as described above since the piezoelectric element 2 has a high resistance and does not allow to take out an output directly therefrom. Further, the impedance converter circuit 8, etc. are arranged at adequate locations under the base plate 1 (see FIG. 1), and the piezoelectric element 2 and the impedance converter circuit 8 are accommodated in the container 5 for preventing breakage of the base plate 1, the piezoelectric element 2, etc. and protecting the detector from external noise due to eletromagnetic induction.

In the air pressure variation detector according to the present invention which is composed as described above, the piezoelectric element 2 is supported at the end 2a thereof on the base plate 1 and has the strip-like shape, whereas the other end 2b thereof is located within the inside region of the through hole 1a formed in the base plate 1, whereby said other end 2b can be vibrated in the through hole 1a. Accordingly, the other end 2b can vibrate while responding sensitively to variations of air pressure transmitted into the container 5a through the vent hole $5b_1$, and the piezoelectric element 2 which is deformed by these vibrations generates output voltages. Therefore, the air pressure variation detector according to the present invention is capable of detecting slight pressure variations.

Figure 6:
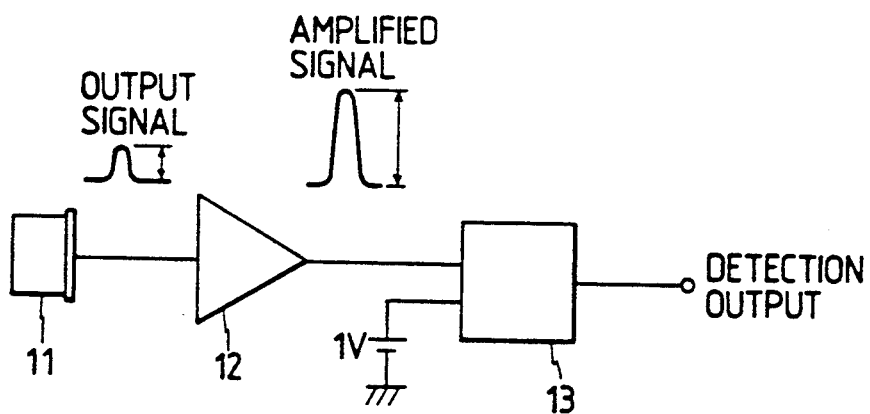
FIG. 6 is a block diagram illustrating a detecting system using the air pressure variation detector according to the present invention.

Now, description will be made on examples of actual experiments carried out with the air pressure variation detector according to the present invention. FIG. 6 shows a configuration of a detecting system used for these experiments. In this drawing, the reference numeral 11 represents the air pressure variation detector having the configuration described above, the reference numeral 12 designates as amplifier for amplifying the output voltages from said air pressure variation detector 11, and the reference numeral 13 denotes a comparator which has a threshold voltage value of approximately 1 V and is to be turned ON when the output voltage amplified by the amplifier 12 is higher than 1 V. With the detecting system installed in a room (capacity 170 $m^3$) of a concrete building and in an automobile (capacity 2.7 $m^9$) respectively, detecting operation tests were carried out by opening and closing doors to an opening degree of 45° at a speed of approximately 0.2 m/sec in both the cases. In addition, the door of the room of the concrete building had an area of 1.62 $m^2$ and the door of the automobile had an area of 0.9 $m^2$. Results obtained by carrying out the tests as described are summarized in the following Table 1 wherein the mark "○" indicates a case where the comparator 13 was turned ON, whereas the mark "x" indicates a case where the comparator 13 was not turned ON, or it stayed in the OFF condition. In addition, "Comparison example" corresponds to test results obtained with an air pressure variation detector employing a piezoelectric element which was different in thickness, shape and supported mode from the piezoelectric element 2 used in the air pressure variation detector according to the present invention.

TABLE 1

| Condition of element | | | Room in | | |
|---|---|---|---|---|---|
| Thickness μm | Shape | Supported mode | concrete building | Automobile | |
| 90 | Strip | One-end support | ○ | ○ | (Present invention) |
| | Strip | Both-end support | x | x | (Comparison example) |
| | Square | One-end support | x | x | |
| | Square | Both-end support | x | x | |
| | Circle | Four-point support | x | x | |
| 200 | Strip | One-end support | ○ | ○ | (Present invention) |
| 300 | Strip | One-end support | x | ○ | |
| 400 | Strip | One-end support | x | x | (Comparison example) |

As is clear from the Table 1, the air pressure variation detector according to the present invention has sensitivity far higher than those of the comparison examples by allowing the piezoelectric element 2 to be vibrated with a larger amplitude at the other end 2b thereof than the piezoelectric elements having the circular (diaphragm), square and rectangular shapes used in the comparison examples listed in the Table 1 since the air pressure variation detector according to the present invention adopts the piezoelectric element 2 which has the strip-like shape and is supported only at one end thereof so as to allow the other end 2b of the piezoelectric element 2 to be vibrated freely and sensitively. Further, the thickness of the piezoelectric element 2 which is specified below 300 μm for structurally assuring such vibrations of the other end 2b of the piezoelectric element 2 should preferably be around 90 μm since the piezoelectric element 2 will easily be broken and can hardly be molded if it is too thin.

The substances such as lead zirconate titante and barium titanate mostly have pyroelectric characteristics in addition to the pieroelectric characteristics thereof and may easily allow spurious signals to be produced by the pyroelectricity generated under influence due to variations of ambient temperatures. Especially in a case where ambient temperature varies abruptly, the piezoelectric element generates high pyroelectricity in a moment and excessive electric charges are accumulated in the gate 9a of the FET 9, thereby placing the FET 9 in an inoperative condition (referred to as a saturated condition). In contrast, the present invention can make the piezoelectric element completely free from the influence due to the pyroelectricity generated by variation of ambient temperature when resistance of the leak resistor used in the impedance converter circuit is set so as to allow the above-mentioned excessive electric charges to leak adeqately and prevent the piezoelectric sensitivity of the piezoelectric element from being lowered. Since the setting of the resistance of the leak resistor 10 is important, relationship between the resistance of the leak resistor 10 and sensitivity of the air pressure variation detector 11 used in the above-described detecting system will be described with reference to FIG. 7. In this drawing, the air pressure variation detector 11 is accommodated in an enclosed box 14 consisting of an aluminium casing 800 mm wide by 400 mm deep by 400 mm high, and connected to an oscilloscope 15 through the amplifier 12. On the other hand, a loudspeaker 16 having resistance of 4 ohms and output power of 4 watts is installed in close contact B with the outside surface of the enclosed box 14. The piezoelectric element 2 of the air pressure variation detector 11 is of unionorph type 90 μm thick, has the strip-like shape and is supported only at one end thereof. The loudspeaker 16 is arranged in opposite to the vent hole 5b₁ of the container 5 accommodating the above-described piezolelctric element 2.

Figure 7:
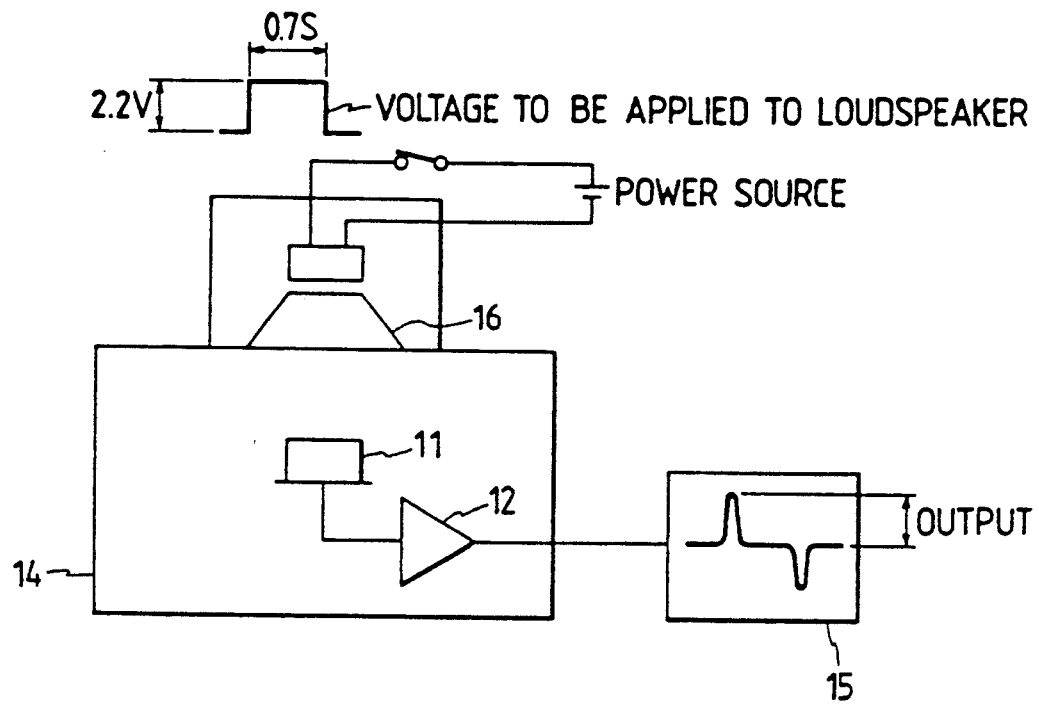
FIG. 7 is a block diagram illustrating another detecting system using the air pressure variation detector according to the present invention.

When the enclosed box 14 was vibrated by applying a driving voltage of 2.2 V having a pulse width of 0.7 sec. to the loudspeaker 16 in the detecting system illustrated in FIG. 7, air pressure was varied in the enclosed box 14, and the air pressure variation detector 11 detected the pressure variation and generated an output voltage so that a pressure variation signal was displayed on the screen of the oscillioscope 15. Relationship between the resistance of the leak resistor 10 and the output of the air pressure variation detector 11 is listed in the following Table 2:

TABLE 2

| Resistance of leak resistor (Ω) | $10^7$ | $10^7$ | $10^7$ | $10^7$ | $10^{7''}$ | $10^{7''}$ |
|---|---|---|---|---|---|---|
| Output ($V_{peak}$) | 0 | 2.5 | 3 | 3 | 3 | 3 |

As is clear from the Table 2, the leak resistor must have resistance of at least $10^7$ Ω for maintaining sensitivity of the air pressure variation detector 11 within a practically usable range.

Now, relationship between the resistance of the leak resistor 11 and temperature variation will be described below. Potential produced by the pyroelectricity described above is expressed by the following formula (1):

$$V = (dP_s/dT)\cdot(dT/dt)\cdot A \cdot R \tag{1}$$

wherein the reference symbol V represents the voltage (V) generated under the pyroelectric effect, the reference symbol (dPs/dT) designates the pyroelectric coefficient (C/cm². °C.) of the piezoelectric element, the reference symbol (dT/dt) denotes the temperature variation speed (deg/sec), the reference symbol A represents the area (cm²) of the electrode, and the reference symbol R designates the equivalent resistance (Ω) of the equivalent circuit including the piezoelectric element 2 and the impedance converter circuit 8.

In order to prevent the FET 9 of the impedance converter circuit 8 from being saturated, the potential defined by the formula (1) must be lower than the voltage determined by substracting the voltage at the operating point of the FET 9 from the power source voltage applied to the FET 9, and should preferably be lower than ½ of this voltage. In order to lower the potential of the pyroelectricity, it is sufficient to reduce the pyroelectric coefficient, the area of the electrode and the equivalent resistance in the formula (1). However, the pyroelectric coefficient cannot be varied remarkably by changing the pieoelectric element substance. In addition, the area of the electrode cannot be narrowed below a certain limit since a narrower area of the electrode degrades the piezoelectric sensitivity. Accordingly, it is effective for lowering the potential of the pyroelectricity to change the above mentioned equivalent resistance. Since the equivalent resistance is determined as a total sum of the resistance of the piezoelectric element 2, that of the FET 9 and that of the leak resistor 10, the equivalent resistance is substantially equal to the resistance of the leak resistor 10 when determined as the minimum of the total resistance.

The resistance of the leak resistor 10 was estimated by using, in the formula (1), a typical value of $4 \times 10^6$ C/cm². °C. of lead zirconate titanate as the pyroelectric coefficient (dPs/dT), 0.167 °C./sec which was the maximum variation speed in the automobile as the temperature variation speed (dT/dt), 0.02 cm² as the area of the electrode, and an allowable pyroelectric voltage of 1.25 V, which was determined on an assumption that a power source voltage of 5 V is applied to the FET 9 when said opereting point is at 2.5 V, as the voltage generated under the pyroelectric effect. This estimation gave resistance R of the leak resistor $10 = 10^{10}$ Ω.

Figure 8:
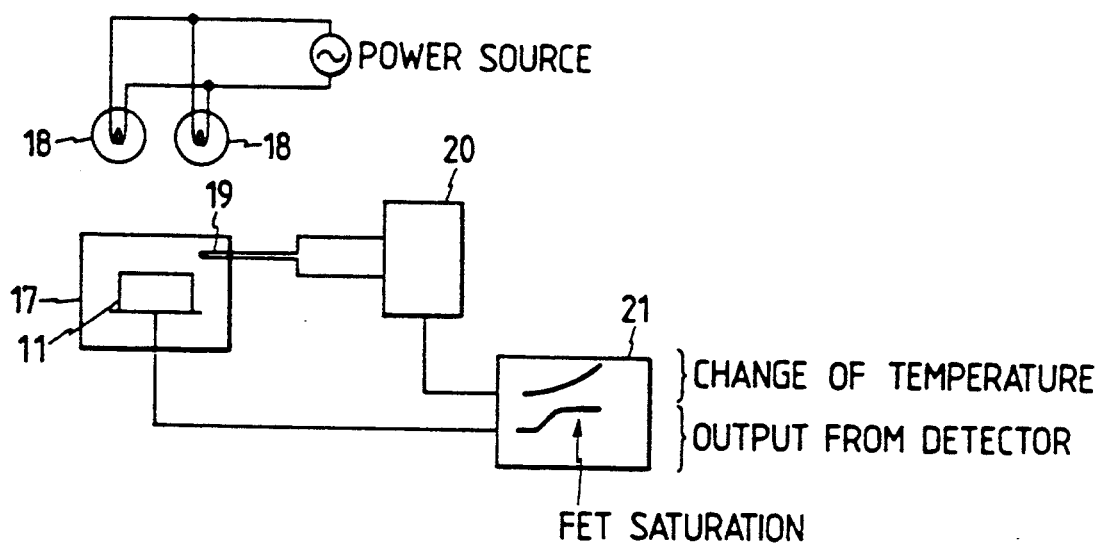
FIG. 8 is a block diagram illustrating a system for carrying out tests for confirming resistance of the leak resistor used in the air pressure variation detector according to the present invention

Further, in order to confirm whether or not the estimated value of the resistance of the leak resistor 10 was adequate, confirmation tests were carried out by using a system which is illustrated in FIG. 8. For these tests, the air pressure variation detector 11 was accommodated in a paper box 17 180 mm wide by 150 mm deep by 80 mm high, which was heated with two lamps 18 (100 V, 250 W) for color copy. Further, temperature in the box 17 was detected with a thermocouple 19 and fed through a temperature-voltage converter 20 into a two-pen type/-recorder 21 which is connected to the air pressure variation detector 11. Results of the confirmation tests are summarized in the following Table 3, which clarifies that the upper limit of the resistance of the leak resistor 10 lies at $R = 10^{10}$ Ω as determined by the estimation described above and judged from the relationship between the resistance of the leak resistor 10 and the temperature variation speed at which the FET 9 is saturated in the air pressure variation detector 11.

TABLE 3

| Resistance of leak resistor | 10' | 10' | 10' | 10" | 10" |
|---|---|---|---|---|---|
| Temperature variation speed allowing saturation of FET (°C./min) | Not saturated | Not saturated | Not saturated | 10 | 1 |

Though the piezoelectric element 2 is of the so-called unimorph type which is composed of a single piezoelectric ceramic in the embodiment described above, it is possible to use the so-called bimorph type piezoelectric element which is composed of two piezoelectric ceramics cemented to each other so that the polarized directions thereof are opposed to each other. The bimorph type piezoelectric element having the same thickness as a whole as that of the unimorph type piezoelectric element can provide sensitivity twice as high as that of the unimorph type piezoelectric element.

As is understood from the foregoing description, the air pressure variation detector according to the present invention adopts the piezoelectric element which has the strip-like shape and is supported only at one end thereof, thereby having a simple composition thereof and permitting simplifying the configuration of the detecting systems using said air pressure variation detector. In addition, the air pressure variation detector according to the present invention is capable of detecting with high accuracy slight variations of air pressure in the inaudible region wherein the conventional detectors are ineffective, and permits judging with high accuracy whether or not enclosed conditions of enclosed spaces such as rooms are broken.

What is claimed is:

1. An air pressure variation detector comprising:
   a base plate having a through hole or a cavity;
   a piezoelectric element equipped on both the surfaces thereof with electrodes, formed in a strip-like shape having a width narrower than the inside width of said through hole or cavity and a thickness thinner than 300 μm, and fixed to said base plate in the form of a cantilever;
   an impedance converter circuit consisting of a field effect type transistor and a leak resistor; and
   an electrically conductive accommodating container having a vent hole;
   said base plate and said piezoelectric element being disposed within said accommodating container; and
   said air pressure variation detector being adapted to be capable of detecting variations of pressure of air admitted into said accommodating container through said vent hole by:
   an end of said piezoelectric element being supported on said base plate so that said piezoelectric element can be vibrated in said through hole or cavity of said base plate,
   an output terminal of said piezoelectric element being connected to a gate of said field effect type transistor of said impedance converter circuit, and
   said leak resistor being connected between said gate and a ground terminal of said piezoelectric element.

2. An air pressure variation detector according to claim 1, wherein the resistance value of said leak resistor is selected so as to allow excessive electric charges accumulated in the gate of said field effect type transistor to leak adequately.

3. An air pressure variation detector according to claim 1, wherein said piezoelectric element is formed by molding a piezoelectric ceramic material.

4. An air pressure variation detector according to claim 3, wherein said piezoelectric ceramic material is one of: lead zirconate titanate (PZT) and barium titanate ($BaTiO_3$).

5. An air pressure variation detector according to claim 1, wherein said impedance converter circuit is disposed within said accommodating container.

6. An air pressure variation detector according to claim 1, wherein said impedance converter circuit is disposed outside of said accommodating container.

7. An air pressure variation detector according to claim 1, further comprising an air volume disposed adjacent to said piezoelectric element, said air volume being sufficiently large so as to permit bending of said piezoelectric element without said bending causing a pressure buildup sufficiently large so as to significantly counteract said bending.

8. An air pressure variation detector according to claim 7, wherein:
   said air volume is in communication with ambient air to permit a slow variation of air pressure in the ambient air to enter said air volume;
   said air pressure variation detector further comprises restricting means for delaying the entrance into said air volume of a sudden variation of air pressure in the ambient air, said sudden variation of air pressure being more rapid than said slow variation of air pressure;
   said piezoelectric element comprises a portion of said restricting means; and
   said piezoelectric element is configured to bend and generate an electric signal upon application of the sudden variation of air pressure.

* * * * *

UNITED STATES PATENT AND TRADEMARK OFFICE
CERTIFICATE OF CORRECTION

PATENT NO. : 5,293,095
DATED : March 8, 1994
INVENTOR(S) : Yukitoshi TAMURA and Stephen J. LANE It is certified that error appears in the above-indentified patent and that said Letters Patent is hereby corrected as shown below:

On the title page, item: [57], lines 15-16 of the Abstract section, after 'the' delete "enaudible" and insert --inaudible--.

In column 1, line 16, after 'of' delete "on".

In column 2, line 57, after 'sectional' delete "view" and insert --views--.

In column 3, line 33, after 'cavity' delete "la" and insert --1a'--.

In column 5, line 20, after 'the' delete "pieroelectric" and insert --piezoelectric--.

In column 5, line 48, after 'contact' delete "B".

In column 5, line 50, after 'of' delete "unionorph" and insert --unimorph--.

UNITED STATES PATENT AND TRADEMARK OFFICE
CERTIFICATE OF CORRECTION

PATENT NO. : 5,293,095
DATED : March 8, 1994
INVENTOR(S) : Yukitoshi TAMURA and Stephen J. LANE It is certified that error appears in the above-indentified patent and that said Letters Patent is hereby corrected as shown below:

In column 6, line 15, delete the entire formula and insert --V=(dPs/dT)·(dT/dt)·A·R--.

In column 6, lines 20-21, after 'coefficient' delete "(C/cm$^2$.°C.)" and insert --(C/cm$^2$.°C)--.

In column 6, line 39, after 'the' delete "pieoelectric" and insert --piezoelectric--.

In column 6, line 53, delete "C/cm$^2$.°C." and insert --C/cm$^2$.°C--.

Signed and Sealed this

Third Day of December, 1996

BRUCE LEHMAN

Attest:

Attesting Officer        Commissioner of Patents and Trademarks